United States Patent
Bland

(10) Patent No.: US 11,203,138 B2
(45) Date of Patent: Dec. 21, 2021

(54) MOLDED AUTOMOTIVE FLUID DISPENSING AND MANIFOLD DISTRIBUTION SYSTEM

(71) Applicant: U.S. Farathane Corporation, Auburn Hills, MI (US)

(72) Inventor: Wayne Bland, Fort Gratiot, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 115 days.

(21) Appl. No.: 16/672,683

(22) Filed: Nov. 4, 2019

(65) Prior Publication Data

US 2020/0139598 A1    May 7, 2020

Related U.S. Application Data

(60) Provisional application No. 62/754,629, filed on Nov. 2, 2018.

(51) Int. Cl.
| | |
|---|---|
| *B29C 45/14* | (2006.01) |
| *B29C 45/16* | (2006.01) |
| *B60S 1/48* | (2006.01) |
| *B29L 31/30* | (2006.01) |

(52) U.S. Cl.
CPC .... *B29C 45/14065* (2013.01); *B29C 45/1671* (2013.01); *B29C 2045/1673* (2013.01); *B29L 2031/30* (2013.01); *B60S 1/48* (2013.01)

(58) Field of Classification Search
None
See application file for complete search history.

(56) References Cited

U.S. PATENT DOCUMENTS

| | | | |
|---|---|---|---|
| 4,893,865 A | 1/1990 | McClain et al. | |
| 5,098,637 A | 3/1992 | Hendry | |
| 7,081,179 B2 * | 7/2006 | Hartlmeier | B29C 45/0062 156/245 |
| 7,097,439 B2 * | 8/2006 | Koyama | B29C 45/0062 425/112 |
| 7,219,953 B2 | 5/2007 | Mori | |
| 7,291,302 B2 * | 11/2007 | Koyama | B29C 45/0062 264/255 |

(Continued)

FOREIGN PATENT DOCUMENTS

| | | | |
|---|---|---|---|
| EP | 1060868 | * | 12/2000 |
| JP | 11179758 | * | 7/1999 |

*Primary Examiner* — Edmund H Lee
(74) *Attorney, Agent, or Firm* — Dinsmore & Shohl LLP

(57) ABSTRACT

A process and assembly for incorporating a molded automotive fluid dispensing and manifold distribution system into an injection molded panel, including the steps of providing a mold and forming in a first injection molded shot a thermoplastic panel of a first material, opening the mold and positioning against a surface of the panel a previously produced manifold distribution system including at least a main manifold section and at least one branching section communicating with a nozzle outlet and reclosing the mold and subsequently forming in a second injection molded shot a second softer thermoplastic material in order to bond the manifold system to the first show panel. Other steps include forming the manifold distribution system in a secondary cavity with the first shot panel, following which a pick-and-place robot aligns the panel and manifold prior to the shot of softer material.

4 Claims, 6 Drawing Sheets

(56) References Cited

U.S. PATENT DOCUMENTS

| | | | |
|---|---|---|---|
| 8,002,335 | B2 | 8/2011 | Usuda |
| 9,085,096 | B2 | 7/2015 | Wenzel et al. |
| 9,669,805 | B2 | 6/2017 | Caillot et al. |
| 2003/0003252 | A1 | 1/2003 | Yun et al. |
| 2004/0099456 | A1 | 5/2004 | Cohen et al. |
| 2005/0040674 | A1 | 2/2005 | Vanlterson |
| 2018/0104871 | A1 | 4/2018 | Birka |

\* cited by examiner

MOLDED AUTOMOTIVE FLUID DISPENSING AND MANIFOLD DISTRIBUTION SYSTEM

CROSS REFERENCE TO RELATED APPLICATIONS

The present application claims the priority of U.S. Ser. No. 62/754,629 filed Nov. 2, 2018.

FIELD OF THE INVENTION

The present invention discloses a prefab manifold subassembly, such as incorporating into a two shot rotary process for creating such as a multi-durometer integrated cowl and which avoids the requirement for post installation of such as fluid transfer hoses, couplings and nozzles in one or more secondary operations.

The pre-constructed fluid manifold is inserted in the rotary molding process and includes a network of interconnected hollow cross sectional sections which, according to one variant, is pre-produced between the first and second shot cycles for creating the integrated fluid sub assembly within the main assembly. The fluid manifold may be bonded and sealed by the soft second shot material, such as currently being molded on other areas of the first shot material.

The manifold also has the option of being molded in a secondary cavity with the first shot cowl and then transferred via robot (pick-in-place) to an alignment nest to complete the hollow molding process with soft material. In either instance, purchased products such as specified spray nozzles would installed post molding whereas pre-fabricated nozzles would be molded as an integrated part of the manifold with spray pattern inserts, installed post mold if required. In this fashion, the proposed design and process reduces cost through component piece price and assembly labor.

BACKGROUND OF THE INVENTION

The prior art is documented with variations of fluid transfer assemblies incorporated into a cowl assembly. A first example this is the cowl cover with integrated washer fluid passageway disclosed in U.S. Pat. No. 7,219,953 to Mori which teaches an integrated washer fluid passageway using a gas assisted injection molding process. The cowl cover includes a single unitary layer defined between upper and lower surfaces. The washer fluid passageway is formed in the single unitary layer between the upper and lower surfaces including by gas-assisted injection molding such that the cowl cover is a unitary, single piece homogenous member.

Vanulterson, US 2005/0040674 discloses a cowl grille structure for positioning in a space between a lower edge of a motor vehicle windshield and a rear edge of a motor vehicle hood. In one embodiment the cowl grille structure includes a molded main body planar leaf screen portion, a washer fluid channel extending along the main body portion and molded integrally with the main body portion, and mounting structure molded integrally with the main body portion for receiving a windshield washer nozzle member with the nozzle member in fluid communication with the integral channel whereby windshield washer fluid may be delivered to the nozzle member through the integral channel. In a second embodiment the washer fluid channel is defined by a molding positioned along the rear edge of the main body leaf screen portion between the rear edge of the main body portion and the lower edge of the windshield.

Other references of note include the fluid center of Cohen US 2004/0099456 which teaches a prefab unit mounted to a cowl structure. McClain U.S. Pat. No. 4,893,865 further teaches a unitized cowl and wiper arm assembly including a leak-proof reservoir interior.

SUMMARY OF THE PRESENT INVENTION

The present invention teaches a process and assembly for incorporating a molded automotive fluid dispensing and manifold distribution system into an injection molded panel. The associated process includes the steps of providing a mold and forming in a first injection molded shot a thermoplastic panel of a first material, following which the mold is opened and a previously produced manifold distribution system is inserted. The manifold distribution system includes at least a main manifold section and at least one branching section communicating with a nozzle outlet. The mold is then reclosed for subsequently forming in a second injection molded shot of a second softer thermoplastic material in order to bond the manifold system to the first panel. Other steps include forming the manifold distribution system in a secondary cavity with the first shot panel, following which a pick-and-place robot aligns the panel and manifold prior to the shot of softer material.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
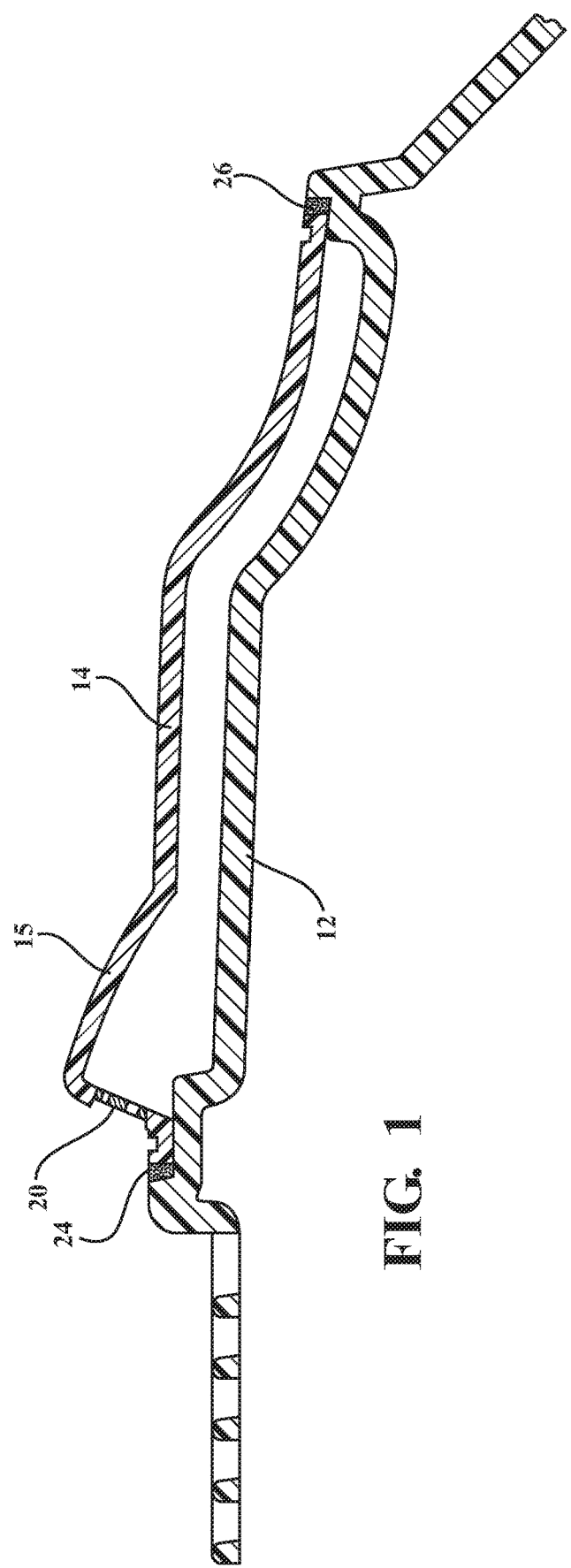
FIG. 1 is a cutaway view of a nozzle section built in an injection molded cowl panel with integrated manifold according to the present invention.
Figure 2:
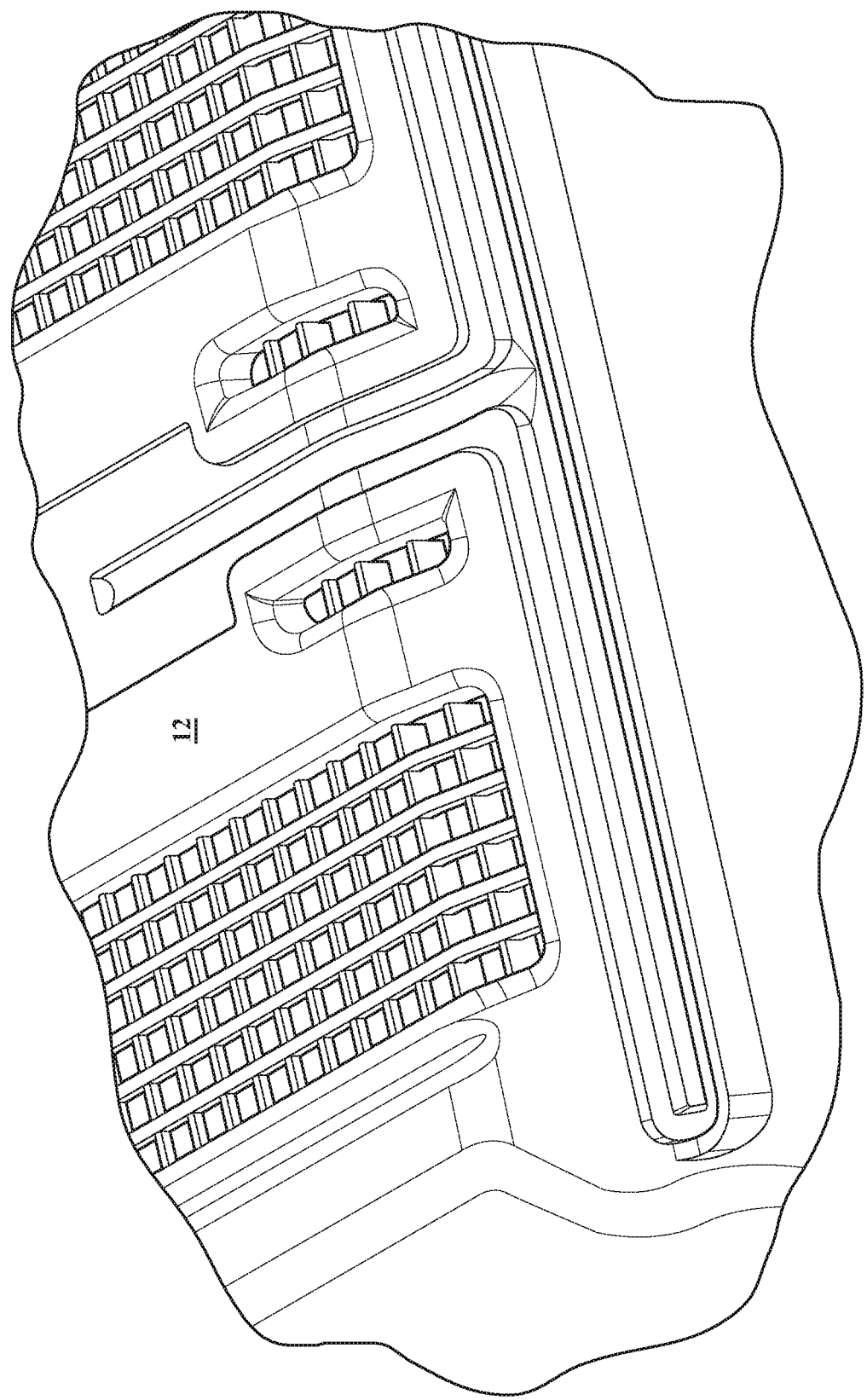
FIG. 2 is an iso perspective view of the cowl panel into which is incorporated into the manifold distribution system according to the present invention.
Figure 3:
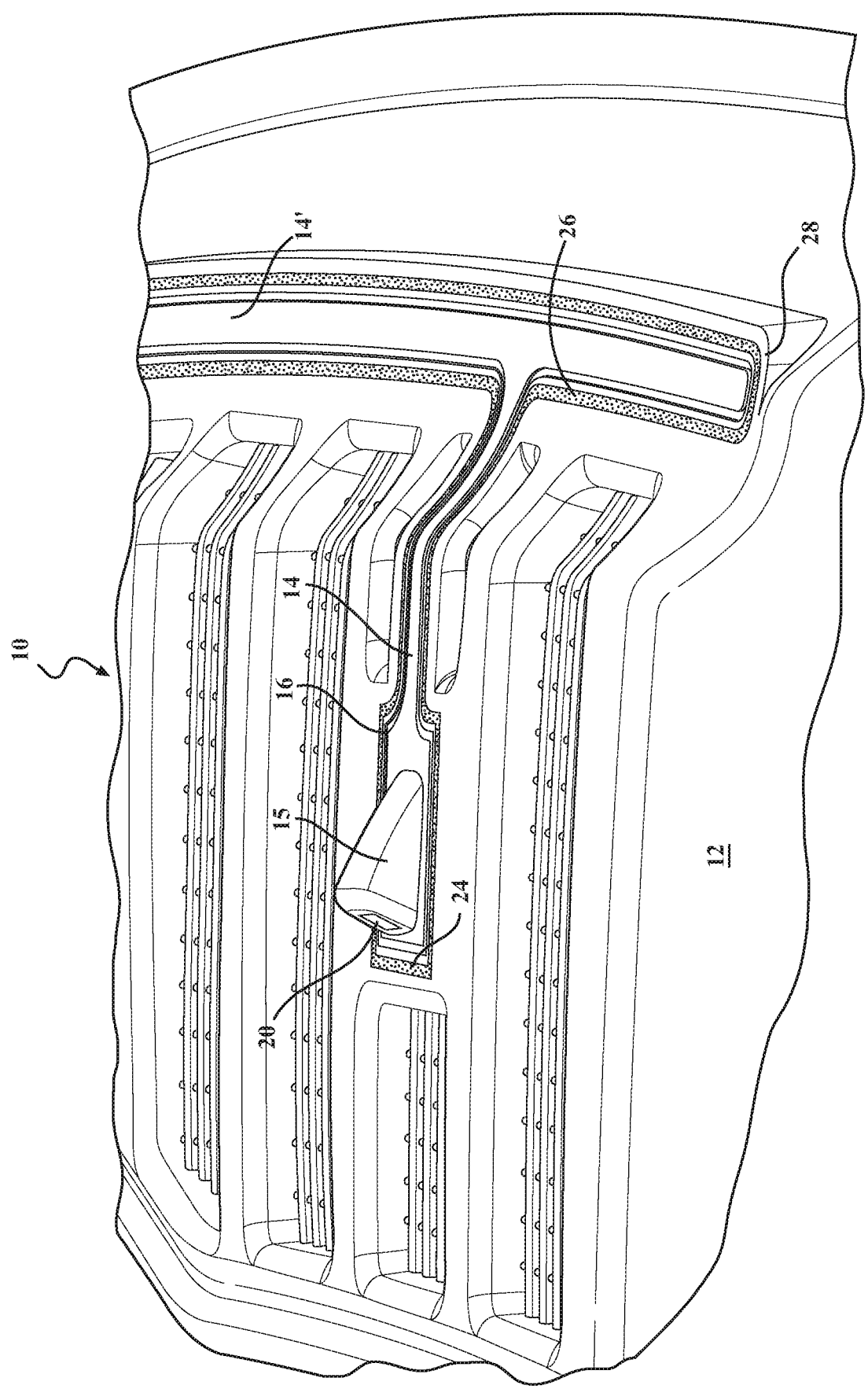
FIG. 3 is a rotated iso view of the cowl panel in FIG. 3 illustrating the manifold distribution system.

With reference to FIGS. 1-6, the present invention discloses a prefab manifold subassembly, see as best shown generally at 10 in the iso perspective view of FIG. 3, and such as incorporating into a two shot rotary process for creating such as a multi-durometer integrated cowl 12, and which avoids the requirement for post installation of such as fluid transfer hoses, couplings and nozzles which are normally conducted during one or more secondary operations.

Figure 6:
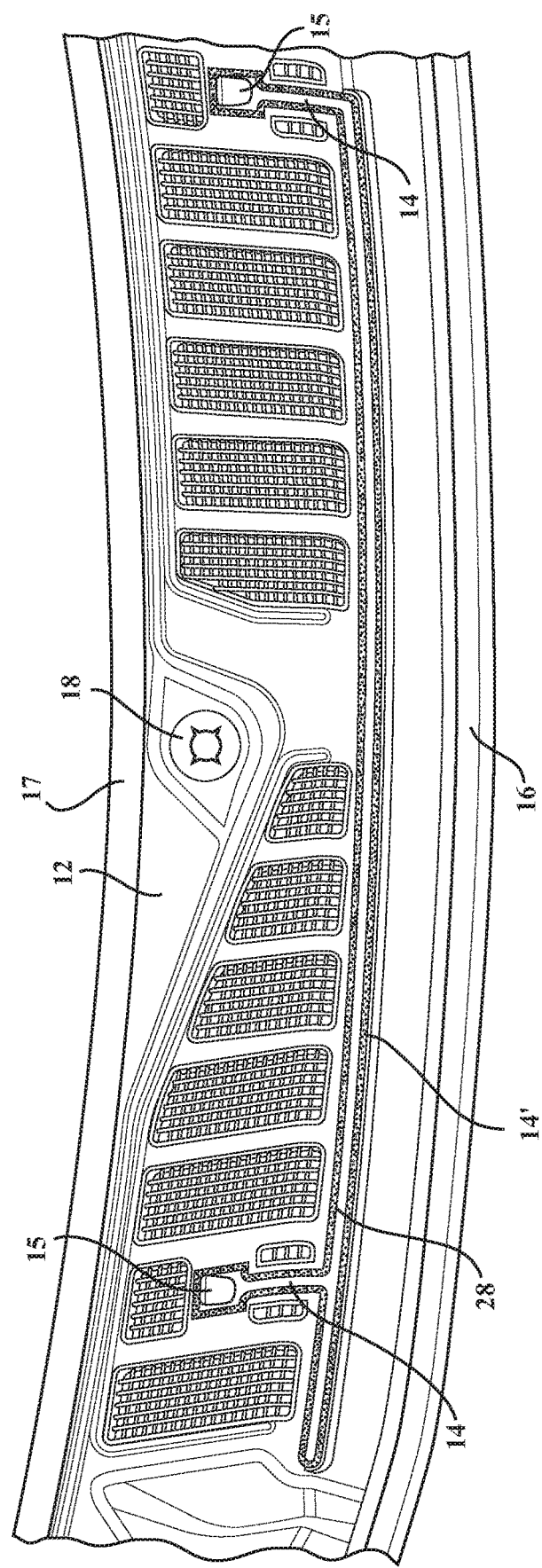
FIG. 6 is a rotated top view of the panel of FIG. 5 and showing the integration of the fluid dispensing manifold system into the cowl panel.

As will be further described, the pre-constructed fluid manifold is inserted in a rotary molding process (not shown), in one variant occurring between the first and second injection molding cycles, for producing an integrated fluid sub assembly manifold system within the main assembly, and such as which is depicted by nozzle branching section 14 and cross wise extending main manifold section 14' as shown in FIGS. 1, 3 and 6. As understood, the manifold includes any hollow interior article including any arrangement of elongated and interconnecting sections or branches. In a first design, the subassembly including the cowl panel 12 is bonded and sealed by the soft second shot material, this further represented by outer edges 16/17 and inner aperture rim 18 in FIG. 6, and which is molded on other areas of the first shot material.

As described, the manifold also has the option of being molded in a secondary cavity with the first shot cowl 12 and then transferred via robot (including such as a pick-in-place mechanism not shown) to an alignment nest to complete the hollow molding process with the second shot softer materials, again at 16-17 and at 18. In either variant, pre-purchased products such as specified spray nozzles can be installed post molding, whereas pre-fabricated nozzles would be molded as an integrated part of the manifold with spray pattern inserts, and installed post mold if required. In this fashion, the proposed design and process reduces cost through component piece price and assembly labor.

Figure 4:
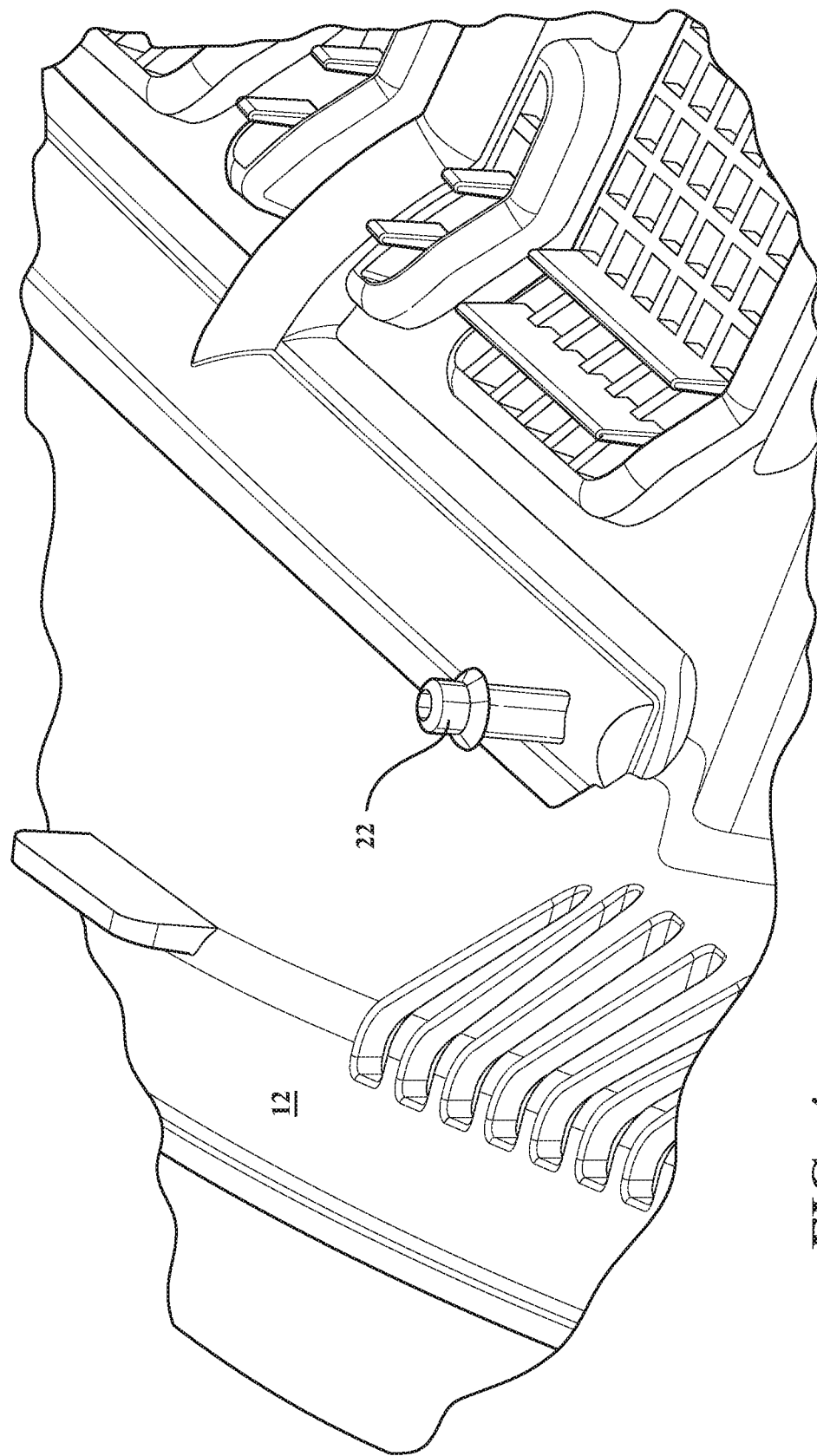
FIG. 4 is a further enlarged view of the cowl panel of FIGS. 2-3 illustrating an integrated hose attachment portion formed into the injection molded panel.

Referring to FIG. 1, a cutaway view is shown of a nozzle section, see further at 20 (see also FIG. 3) built in an injection molded cowl panel with integrated manifold according to the present invention. In relation, FIG. 4 is a further enlarged view of the cowl panel 12 of FIGS. 2-3, and illustrating a hose attaching portion 22 which is integrated into the injection molded panel 12 and which is configured to communicate a fluid input location (such as a windshield wiper fluid) to the panel.

The fluid manifold network (including as again is best shown in FIG. 3 interconnecting sections 14 and 14' as well as nozzle support area 15), upon being applied to the cowl panel 12 according to any of the afore-described methods, provides a sealed subassembly for communicating and directing the fluid flowing through the hose attaching portion 22 (such as by being molded over the portion 22) through to the outlet nozzle or multiple integrated nozzles 20. FIG. 1 further depicts outer softer second shot edge portions 24 and 26 which bound the outer edges of the pre-fabricated and installed fluid manifold 14 (see also as shown in FIG. 3 in relation to the nozzle section of the manifold).

Figure 1A:
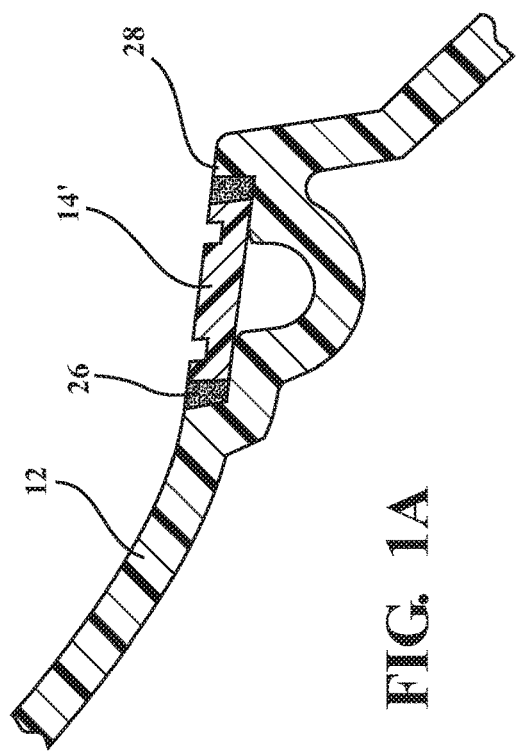
FIG. 1A is an enlarged sectional view of a modification of a portion depicted in FIG. 1 of a standard section of the manifold distribution system.

Referring further to FIG. 1A, an enlarged sectional view is shown of a modification of a portion depicted in FIG. 1 of a standard section (see again at 14' in FIG. 3) with associated outer softer trim portions at 26 and 28) of the manifold distribution system is shown. FIG. 2 is an iso perspective view of the cowl panel 12 into which is incorporated into the manifold distribution system according to the present invention, it being understood that configuration of the first shot injection molded panel 12 can differ from that shown and corresponding to possible variations in the configuration and arrangement of the fluid manifold network depicted in FIG. 3.

FIG. 3 again depicts a rotated iso view of the cowl panel in FIG. 3 illustrating the manifold distribution system according to one non-limiting embodiment. As previously described, the manifold system (interconnecting components including branches 14 and 14', along with fluid distributing nozzle area 15) can include in one instance a pre-manufactured component which is positioned or laid-into the injection mold following formation of the first shot harder thermoplastic material used to create the panel 12, the mold then being reclosed in order to provide a finish shot of the softer thermoplastic material (including forward nozzle branching support edges 24/26 along with main trim edge 28 associated with the standard manifold section 14).

In this manner, the pre-manufactured manifold system integrates numerous subassemblies including hoses, couplers, check valves, and spray nozzles which would otherwise have to be separately provided and installed according to any number of secondary fabrication operations following the formation of the panel 12, thus providing significant time and cost savings. As further previously described, the fluid manifold can alternatively be molded in a secondary cavity along with the previously formed cowl 12, following which it is transferred (such as again via a suitable pick-and-place numerically controlled robot) to an alignment nest in order to complete the hollow molding process with the softer material.

Figure 5:
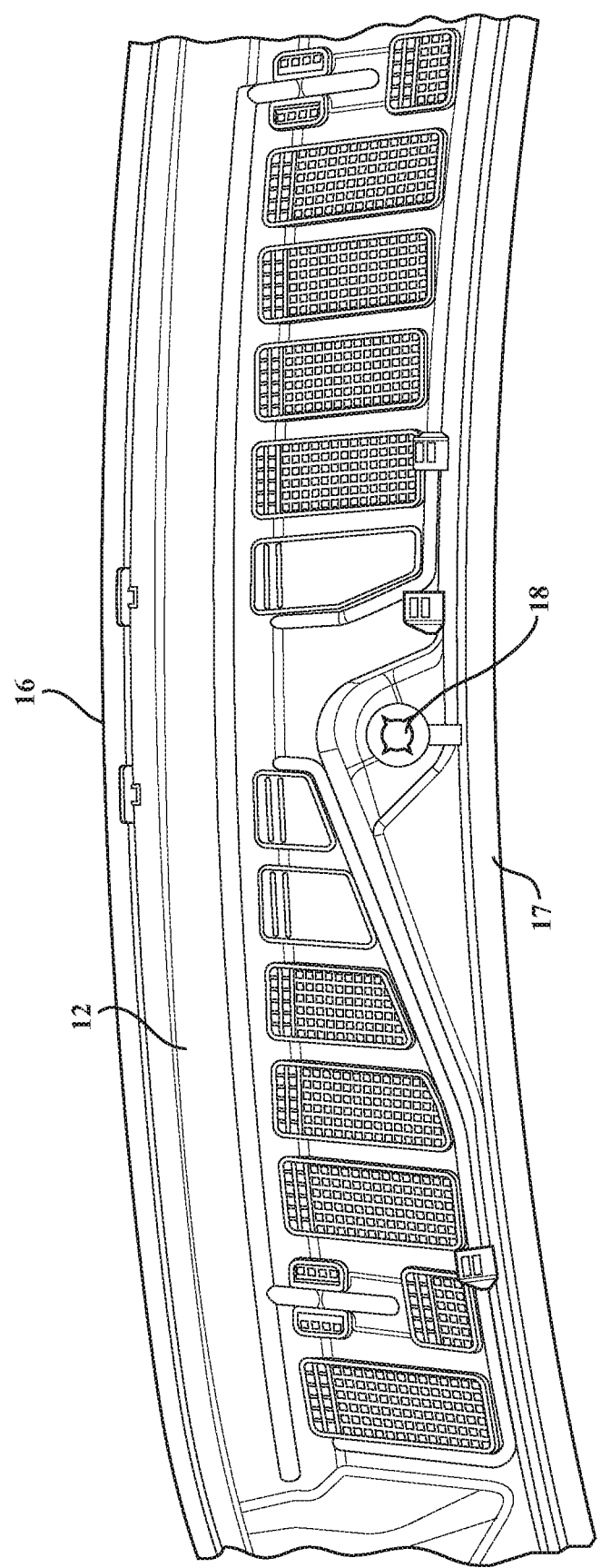
FIG. 5 is a rotated bottom view of the panel of FIGS. 2-4 illustrating the second shot soft material extending around both the exterior perimeter trim of the first shot harder panel as well as the interior of the hose attachment portion.

FIG. 5 is a rotated bottom view of the panel of FIGS. 2-4 illustrating the additional second shot soft material extending around both the exterior perimeter trim of the first shot harder panel 12 (see again outer softer edges 16/17) as well as the interior formed rim 18 of softer material within the indicated through aperture of the cowl panel 12 and such as which can be associated with the location of the hose attachment portion. Finally, FIG. 6 is a rotated top view of the panel of FIG. 5 and showing the integration of the manifold system into the cowl panel 12.

Having described the invention, it again provides reduced part and process costs through reduced component piece price and assembly labor. Beyond the variant disclosed, other and additional preferred embodiments will become apparent to those skilled in the art to which it pertains, and without deviating from the scope of the appended claims.

I claim:

1. A process for incorporating a molded automotive fluid dispensing and manifold distribution system into an injection molded panel, comprising the steps of:
    providing a mold and forming within the mold in a first injection molded shot a thermoplastic panel of a first material;
    opening the mold to reveal the thermoplastic panel;
    positioning a manifold distribution system against the injection molded thermoplastic panel revealed by the opened mold, the manifold distribution system including at least a main manifold section and at least one branching section communicating with a nozzle outlet;
    reclosing the mold containing the injection molded thermoplastic panel and manifold distribution system; and
    forming, in a second injection molded shot a second softer thermoplastic material within the reclosed mold against the first injection molded thermoplastic panel and around the manifold distribution system in order to bond the manifold system to the panel.

2. The process as described in claim 1, further comprising the step of forming the manifold distribution system in a secondary cavity with the first shot panel, following which a pick-and-place robot aligns the panel and manifold prior to application of the second shot of softer material.

3. The process as described in claim 1, further comprising the step of forming a hose attachment portion in the panel as part of the first shot of material.

4. The process as described in claim 3, further comprising the step of communicating a fluid inlet location of the manifold with the hose attachment portion.

\* \* \* \* \*